United States Patent [19]

Taira

[11] Patent Number: 5,309,454
[45] Date of Patent: May 3, 1994

[54] APPARATUS FOR WAVELENGTH CONVERSION OF LASER LIGHT

[75] Inventor: Yoichi Taira, Tokyo, Japan

[73] Assignee: International Business Machines Corporation, Armonk, N.Y.

[21] Appl. No.: 874,937

[22] Filed: Apr. 28, 1992

[30] Foreign Application Priority Data

Jun. 4, 1991 [JP] Japan .................................. 3-159530

[51] Int. Cl.⁵ ............................................. H01S 3/10
[52] U.S. Cl. ........................................ 372/21; 372/98; 372/101; 372/108; 359/328
[58] Field of Search ...................... 372/21, 22, 108, 92, 372/99, 101, 107; 385/122; 359/328, 329

[56] References Cited

U.S. PATENT DOCUMENTS

| | | | |
|---|---|---|---|
| 3,974,507 | 8/1976 | Chemelli et al. | 372/101 |
| 4,272,694 | 6/1981 | Jacobs | 359/329 |
| 5,025,446 | 6/1991 | Kuizenga | 372/21 |
| 5,027,361 | 6/1991 | Kozlovsky et al. | 372/21 |
| 5,038,352 | 8/1991 | Lenth et al. | 372/21 |
| 5,081,639 | 1/1992 | Snyder et al. | 372/101 |
| 5,117,433 | 5/1992 | Tatsuno et al. | 372/22 |
| 5,119,383 | 6/1992 | Duung, III et al. | 372/21 |
| 5,130,844 | 7/1992 | Okazaki | 359/328 |
| 5,130,996 | 7/1992 | Amano et al. | 359/328 |
| 5,130,997 | 7/1992 | Ortiz et al. | 372/21 |
| 5,164,947 | 11/1992 | Lukas et al. | 372/22 |
| 5,181,224 | 1/1993 | Snyder | 372/101 |

Primary Examiner—Leon Scott, Jr.
Attorney, Agent, or Firm—Jeffrey L. Brandt; Louis J. Percello

[57] ABSTRACT

An apparatus for wavelength conversion of laser light which can prevent optical destruction of a wavelength conversion element and achieve a high wavelength conversion efficiency. The apparatus for wavelength conversion of laser light has an optical focusing system for focusing the input laser light on the wavelength conversion element in an optical cavity, which optical focusing system makes the cross-sectional shape of a light beam non-circular, for example, elliptical.

44 Claims, 6 Drawing Sheets

APPARATUS FOR WAVELENGTH CONVERSION OF LASER LIGHT

FIELD OF THE INVENTION

The present invention relates generally to an apparatus for converting the wavelength of laser light, and more particularly to such an apparatus which can obtain a high wavelength conversion efficiency while preventing the optical destruction of a wavelength conversion element.

BACKGROUND OF THE INVENTION

When a strong coherent light such as a laser light passes through a medium having a secondary non-linear optical effect (or a wavelength conversion element, hereinafter referred to as a crystal because such a medium is often an optical crystal), such crystal outputs a light wave having a frequency double the frequency of the input light. Such a crystal also outputs a light wave having a frequency which is the sum or difference of the frequencies of two input components if the input light includes a plurality of frequency components. These are referred to as the generation of a second harmonic, generation of a sum frequency, and generation of a difference frequency, respectively. To enhance the conversion efficiency of a crystal, or the ratio of the converted output light intensity of a new frequency to the input light intensity, it is necessary to satisfy a condition called phase match.

The condition for phase match requires that the refractive indexes of a crystal for a fundamental wave (input light) and a generated second harmonic (output light) are equal in the case of the generation of the second harmonic. Such phase match can be accomplished by utilizing the birefringence of a crystal, for example, by using an ordinary ray as the fundamental wave (input light) and an extraordinary ray as the second harmonic (output light). Depending on the crystal type, by appropriately selecting the orientation and temperature of the crystal, this phase match condition can be achieved within a predetermined wavelength range of the input light. Particularly, a crystal which accomplishes the phase match condition by changing crystal orientation is called an angle phase match type crystal.

As an example of an angle phase match type crystal, there is beta-barium borate ($\beta$-BaB$_2$O$_4$) (hereinafter referred to as BBO). BBO has several excellent features as a wavelength conversion element. It is a uniaxial crystal that has a large non-linear susceptibility to the ultraviolet region, a wide transparency region, phase match in a wide wavelength range, chemical stability, and a relatively high optical destruction strength. It has been proposed in the past to use such BBO as a wavelength conversion element in combination with an optical cavity having a plurality of reflecting surfaces for converting laser light (H. Souma, T. Sato, T. Nishimata, I. Shindo: Proceeding of International Quantum Electronics Conference 1988 Tokyo, PD-7 (1988) 19-22).

If the intensity of the input light is low, the intensity of the output light of the wavelength converter is proportional to the square of the intensity of the input light. If a low-intensity light from a continuous-wave laser is used as the input light, the conversion efficiency is extremely low. Accordingly, for high conversion efficiency, it is necessary to use an optical focusing system in combination with an optical cavity to focus the fundamental wave (input light) onto the crystal. However, since the intensity of the light within the optical cavity is much larger than that of the output light which is emitted outside of the cavity, the crystal is readily destroyed or damaged if the light within the cavity is focused to one point on the crystal by an optical focusing system having spherical lenses.

Thus, in previously known systems, the practical conversion efficiency of an apparatus for wavelength conversion of laser light is determined by the optical destruction or damage condition of the crystal.

With respect to focusing light, it has been proposed that light be focused on a non-linear optical crystal (such as BBO), which is a wavelength conversion element, by using cylindrical lenses (T. G. M. Freegarde, J. Courts, A Corney, "Second Harmonic Generation in Beta-Barium Borate using Elliptical Focusing, "Nonlinear Optical Properties of Materials, 1988 Technical Digest Series Volume 9, Aug. 22-25, 1988, Troy, N.Y., pp. 77-80" and V. D. Volosov, E. V. Nilov, "Effect of the Spatial Structure of a Laser Beam on the Second Harmonic in ADP and KDP Crystals," Optical Spectroscopy (USSR) Vol. 21 (1966), pp. 392-394). However, in these references, placing a wavelength conversion element in an optical cavity was not considered, and thus light was not strongly amplified and the optical destruction of the wavelength conversion element was not a significant problem. In addition, in these references, there was no suggestion with respect to the enhancement of the wavelength conversion efficiency of continuous-wave laser lights of relatively low outputs.

OBJECTS OF THE INVENTION

It is an object of the present invention to provide an apparatus for wavelength conversion of laser light which prevents the optical destruction of a crystal conversion element while obtaining a high wavelength conversion efficiency.

It is another object of the present invention to provide an apparatus for wavelength conversion of laser light which can efficiently convert continuous-wave laser lights.

It is a further object of the present invention to provide an apparatus for generating a coherent light which can efficiently convert laser light and output continuous-wave laser light.

It is still another object of the present invention to provide an apparatus which can double the frequency of an input laser light and convert same to an output coherent light having an intensity of 1 W or greater in the deep ultraviolet region.

SUMMARY OF THE INVENTION

An apparatus for wavelength conversion of laser light or an apparatus for generating a coherent light according to the present invention has an optical focusing system for focusing input light on a crystal within an optical cavity. This optical focusing system includes means for making the cross section of the focused light beam non-circular, preferably, elliptical.

In accordance with the present invention, input light beam focused on the crystal has a non-circular cross section such as ellipse. Therefore, the light energy within the optical cavity is not focused to one point in the crystal. Accordingly, optical destruction due to the focusing of the energy of the light beam within the optical cavity at one point in the crystal can be prevented.

In addition, even if a directional property is provided in the focusing of the light beam on the crystal as in the present invention, the wavelength conversion efficiency is unchanged. Since the crystal has a directional property in the angle at which the crystal can receive the light to be subjected to wavelength conversion, or the acceptance angle, the conversion efficiency of the crystal is not different from a light beam of a circular cross section if the light beam is focused so as to match the acceptance angle. Moreover, light from additional directions is not focused, and accordingly the concentration of light energy can be prevented thereby preventing optical destruction.

DESCRIPTION OF THE DRAWINGS

These and other objects, features and advantages of the present invention will be apparent upon consideration of the following DETAILED DESCRIPTION OF THE INVENTION, when considered with the drawings Figures, in which.

DETAILED DESCRIPTION OF THE INVENTION

Figure 1:
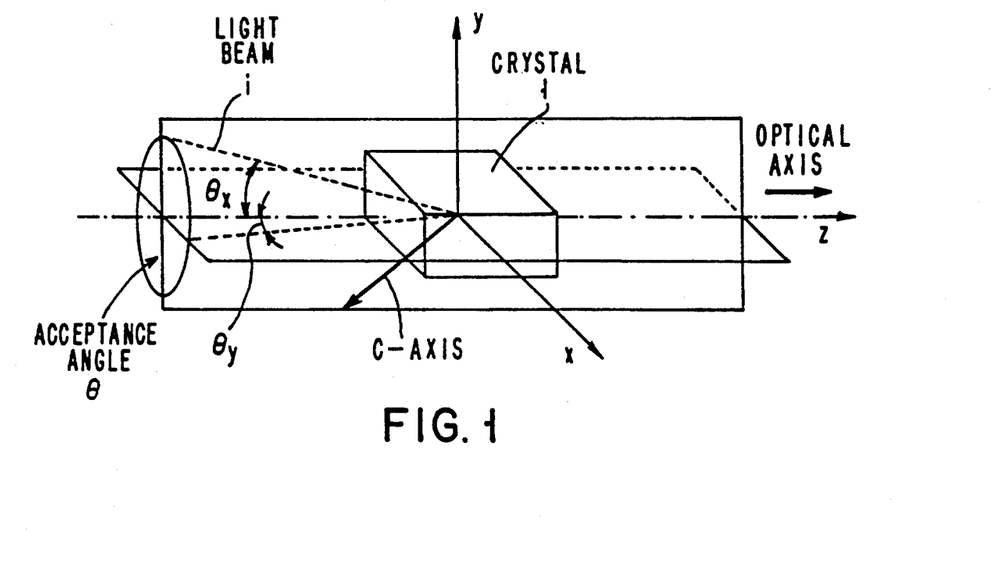
FIG. 1 is a schematic illustration of the reception angle of a crystal used in accordance with the present invention.
Figure 2:
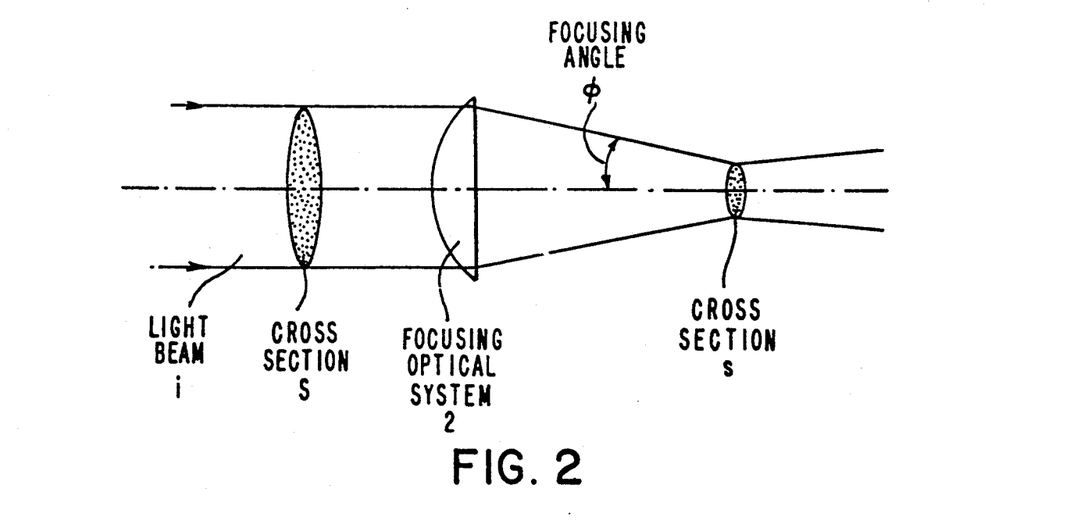
FIG. 2 is a schematic illustration of an optical focusing system using a cylindrical lens in accordance with the present invention.

As shown in FIG. 1, a crystal 1 has an angle range, or acceptance angle $\Theta$, in which it can effectively convert the wavelength of focused input light i. The crystal can effectively perform the wavelength conversion only of the focused input light i in the range of the acceptance angle $\Theta$. Accordingly, it is necessary to select the magnitude of the focusing angle $\Phi$ of the focusing optical system 2 in FIG. 2 in the relationship of $\Theta > \Phi$, so that the focused input light i falls within the range of acceptance angle $\Theta$. If the relationship $\Theta > \Phi$, is maintained, the efficiency is increased S/s times by the optical focusing system 2. Here, S is the cross-sectional area of input light i before focusing, and s is the cross-sectional area of input light i at the place at which it was focused onto crystal 1.

However, the acceptance angle $\Theta$ of the actual crystal 1 has a directional property, and acceptance angle $\Theta_y$ in the plane including the C-axis of crystal 1 and optical axis Z (ZX-plane) and acceptance angle $\Theta_x$ in the plane perpendicular to the ZX-plane and including optical axis Z (YZ-plane) have different magnitudes. Typically, the relationship is $\Theta_x > \Theta_y$. Particularly, for a crystal of the angle phase match type, $\Theta_x > > \Theta_y$ and $\Theta_y$ is very small as compared with $\Theta_x$. Accordingly, the focusing in the YZ-plane determines the conversion efficiency and focusing in the ZX-plane is not effective in increasing the conversion efficiency. This is because the focusing angle $\Phi$ exceeds $\Theta_y$ even if it is of a slight magnitude and results in a relationship $\Theta_x > \Phi > \Theta_y$, and thus most of the focusing in the $\Theta_y$ direction or in the ZX-plane falls outside the range of the acceptance angle $\Theta_y$. To focus input beam i under an optimum condition in response to such a relationship of acceptance angles $\Theta_x$ and $\Theta_y$ of crystal 1, it is necessary to provide a directional property in the focusing of the light beam. That is, it is preferable to use an optical focusing system which includes a cylindrical lens or cylindrical mirror for making the shape of the cross-sectional area of the focused beam non-circular, preferably, elliptical.

With the shape of the cross-sectional area of the focused beam using a cylindrical lens being elliptical, a larger optical energy is dispersed when compared to the cross-sectional area of the focused beam formed by the optical focusing system of a spherical lens that provides a focusing to one point. Thus the optical destruction of the crystal can be prevented.

This is advantageous if a crystal is placed in an optical cavity, and a continuous-wave laser light is focused in the crystal by an optical focusing system to enhance conversion efficiency. The reason for this is that, if a spherical lens focusing system is used to continuously focus laser light into a BBO crystal positioned in an optical cavity, the light intensity within the BBO crystal will likely exceed the strength that causes optical destruction.

However, if a cylindrical lens of the same focal length is used, the light intensity at the focal point decreases as compared with the spherical lens, and optical damage can be avoided without reducing the conversion efficiency.

The reason is that the cylindrical lens weakens the focusing in the one direction (ZX-plane) of the BBO crystal as compared with the focusing in the other direction (ZY-plane), and the focusing in the ZX-plane originally does not contribute very much to the conversion efficiency. In the ZY-plane which contributes greatly to the conversion efficiency, the focusing is similar to that produced by a spherical lens.

Figure 3:
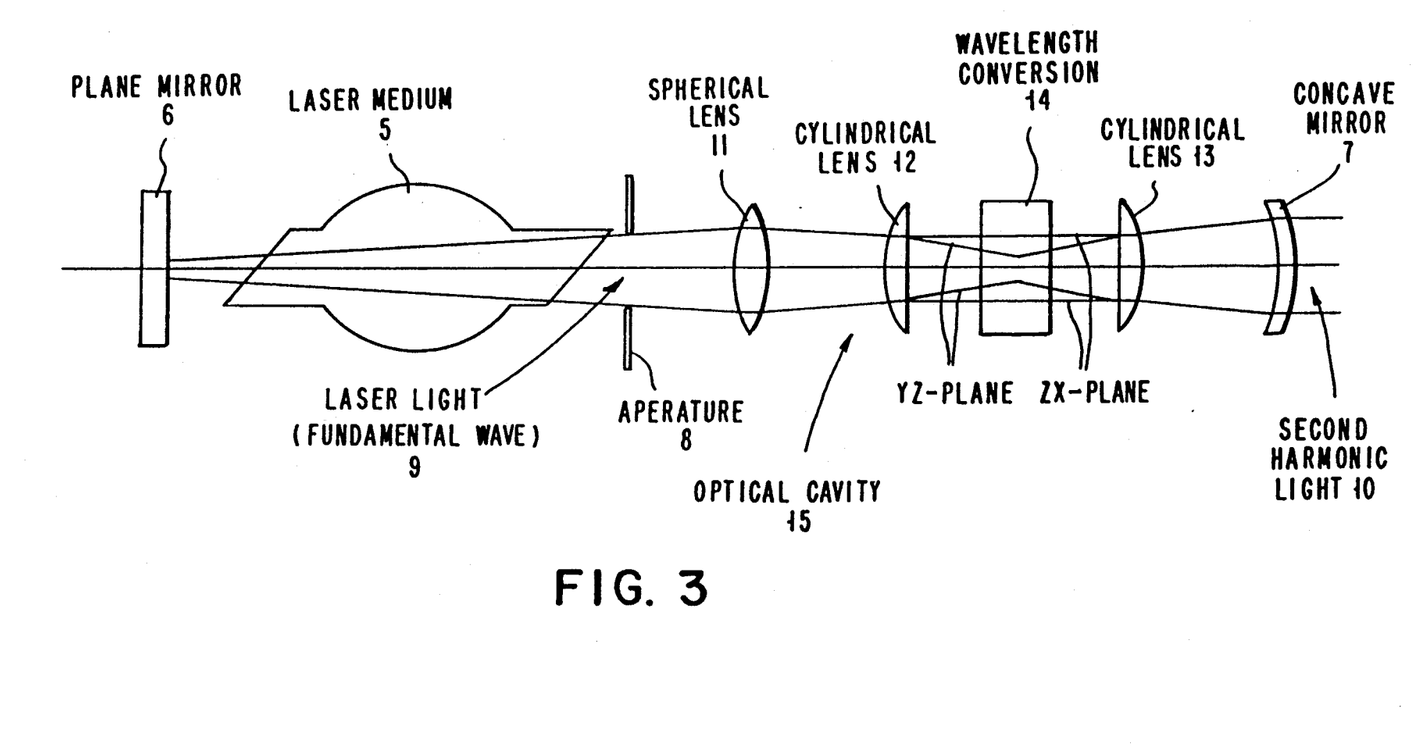
FIG. 3 is a schematic illustration of an optical system for generating coherent light in accordance with the present invention.

FIG. 3 shows an apparatus for generating a coherent light according to the present invention. Laser 5 is a plasma tube having a laser medium therein, such as a continuous-wave argon laser. This argon laser may be one which generates a coherent continuous-wave (CW) laser light 9 having an output of 1 W and a wavelength of $\mu 1$ in the range of visible light (e.g., 514.5 nm, fundamental wave). Mirror 6 is a plane mirror which is highly reflective of light having a wavelength of $\mu 1$ and of deep ultraviolet light with a second harmonic wavelength of $\mu 1$ (wavelength $\mu 2 = 257$ nm). Mirror 7 is a concave mirror which is highly reflective of light having a wavelength of $\mu 1$, but exhibits a high degree of transmissibility to light having a wavelength of $\mu 2$. Accordingly, concave mirror 7 is the output mirror of light 10 having a wavelength of $\mu 2$. Stop 8 is an aperture. Lens 11 is a spherical lens. Lenses 12 and 13 are cylindrical lenses. Crystal 14 is BBO which is a wavelength conversion element, and BBO crystal 14 is sandwiched between cylindrical lenses 12 and 13. Laser medium 5, aperture 8, spherical lens 11, cylindrical lenses 12 and 13, and BBO crystal 14 are thus placed between optical reflecting surfaces 6 and 7 to form therebetween a Fabry-Perot type optical cavity 15 which produces a standing wave with a wavelength of $\mu 1$. Cylindrical lenses 12 and 13 focus laser light 9, having a wavelength of $\mu 1$ from laser medium 5 which goes back and forth in cavity 15, into BBO 14.

Cylindrical lenses 12 and 13 make the cross-sectional shape of the focused laser light beam 9 within crystal 14 elliptical. That is, the component of light 9 in the YZ-plane direction of BBO crystal 14 largely converges, but the component of light 9 in the ZX-plane direction of the crystal does not converge as much. The reason is that the directional component $\Theta_y$ of the acceptance angle is very small as compared with $\Theta_x$ in angle phase match type crystals such as BBO crystal 14, as shown in FIG. 1. Thus, the focusing in the ZX-plane direction does not contribute significantly to the increase of the conversion efficiency of BBO as compared with the focusing in the YZ-plane direction. The focusing in the ZX-plane direction only enhances the light intensity in BBO, contributing to optical damage. Cylindrical lenses 12 and 13 of this embodiment focus the light 9 on BBO crystal 14 while reducing the focusing in the ZX-plane to avoid energy concentration. The present invention thus prevents optical destruction of crystal 14, while enhancing the focusing rate to increase the wavelength conversion efficiency in the YZ-plane where $\Theta_x$ is large.

As an example, when a 1 W laser light 9 of a visible wavelength of 514.5 nm generated by argon laser medium 5 was made into a light beam of a 2 mm-diameter by the use of aperture 8 and spherical lens 11, and focused on BBO crystal 14 (the length is made 6.5 mm) using a pair of cylindrical lenses 12 and 13 having a focal length of 50 mm, 125 $\mu$W coherent second harmonic light 10 having a wavelength of 257 nm in the deep ultraviolet region was obtained. The second harmonic light 10 is obtained from/though output mirror 7.

This inventive system has substantially the same magnitude light output as the second harmonic output which is obtained when the focusing is done using a pair of spherical lenses (not shown) having the same focal length instead of cylindrical lenses 12, 13. However, the light intensity at the focal point for cylindrical lenses 12, 13 is 1/80 as compared with spherical lenses. Accordingly, the light intensity in BBO crystal 14 disposed within optical cavity 15 decreases from 8 MW/cm$^2$ for spherical lenses to approximately 100 kW/cm$^2$ for cylindrical lenses 12, 13, and BBO crystal 14 does not undergo optical destruction.

Thus, there is little difference in efficiency between cylindrical lenses and spherical lenses when the second harmonic of a light of a visible wavelength in the vicinity of 500 nm is generated by using a BBO crystal. Further, a highly efficient optical cavity which suffers from no optical damage to the crystal can be used to generate a deep ultraviolet light from an argon laser using cylindrical lenses as described above.

In accordance with the present invention, optical damage of the BBO crystal 14 can be prevented without reducing the wavelength conversion efficiency. Consequently, if an appropriate coating is applied to the lenses, BBO crystal and the reflecting mirrors in optical cavity 15, the optical loss in the cavity is reduced and a deep ultraviolet light of 1 W or higher (second harmonic of a laser-oscillated light) can easily be generated by using a continuous output type argon laser. This conversion output light in the deep ultraviolet region can, for example, be applied to photolithography and other various applications.

Although the second harmonic conversion of the input laser light is described here, if the input laser light has a plurality of frequencies, that is, if laser medium 5 oscillates laser light by multi-lines, wavelength conversion element 14 can also perform other wavelength conversions such as generation of the sum frequency or difference frequency of two frequencies thereof. It is apparent that the present invention can be applied to not only the second harmonic conversion but also to other wavelength conversion.

Figure 4:
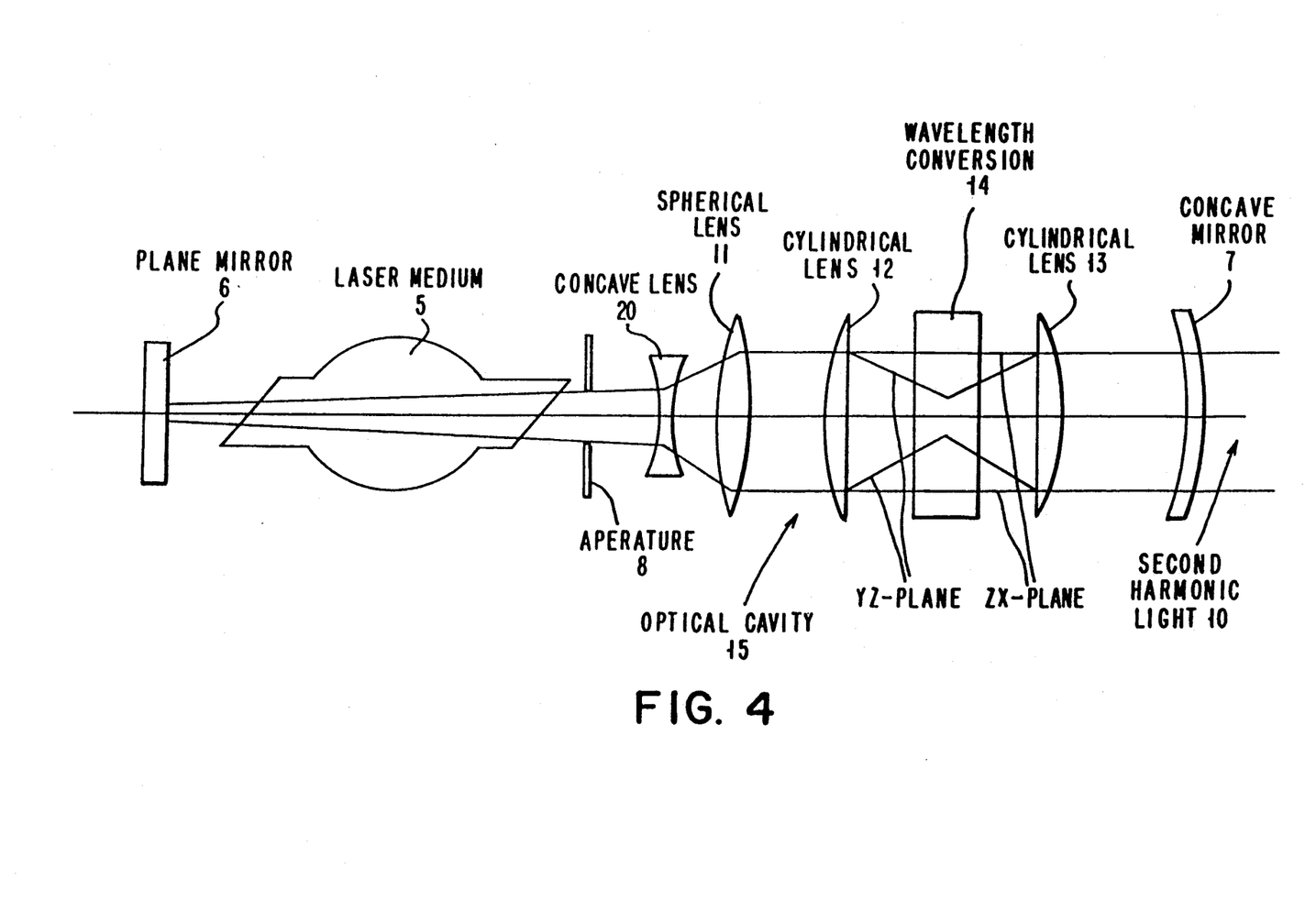
FIGS. 4–8 are schematic illustrations of alternate embodiments, respectively, of optical systems of the present invention.

FIG. 4 shows another embodiment of the present invention. The constructions which are the same as the embodiment in FIG. 3 are assigned the same reference numerals as in FIG. 3 and the description thereof is omitted. The embodiment is an arrangement which reversely expands the light beam in the ZX-plane to prevent damage to crystal 14. This is because the acceptance angle $\Theta_y$ of crystal 14 is very small. For this purpose, concave lens 20 is placed between aperture 8 and spherical lens 11. Accordingly, in this embodiment the focusing on crystal 14 is done only in the ZY-plane.

Figure 5:
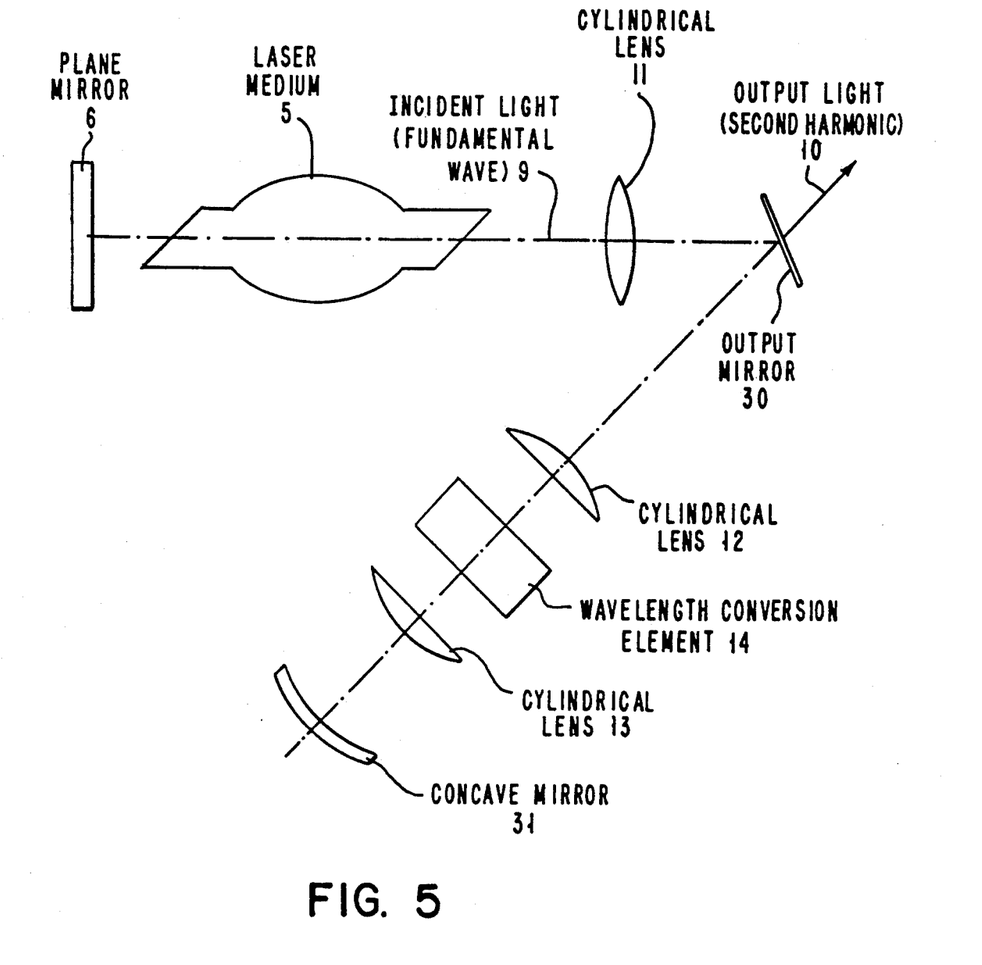

FIG. 5 shows another embodiment of the present invention. The constructions which are the same as the embodiment in FIG. 3 are assigned the same reference numerals and the description thereof is omitted. In this embodiment, to decrease the physical length of the apparatus for generating coherent light, output mirror 30 used for extracting second harmonic 10 is provided in the center of optical cavity 15. This output mirror 30 is highly reflective for fundamental wave 9 with a wavelength of $\mu 1$ and exhibits a high level of permissivity to second harmonic light 10 with a wavelength of $\mu 2$. Concave mirror 31 is highly reflective of both fundamental light wave 9 and second harmonic light wave 10. If a mirror which is transparent to second harmonic light 10 is used as mirror 31, second harmonic light 10 can also be obtained from the mirror 31.

Figure 6:
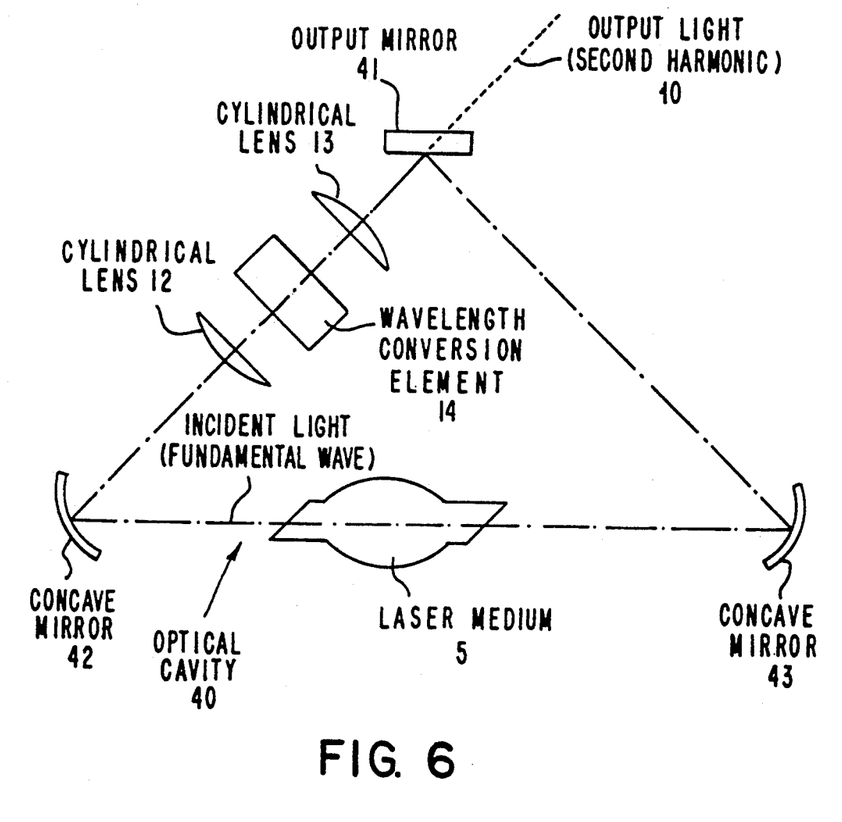

FIG. 6 shows another embodiment of the present invention. The constructions which are the same as the embodiment of FIG. 3 are assigned the same reference numerals and the description thereof is omitted. In this embodiment, optical cavity 40 has a ring-type construction such that light circulates only in one direction, and second harmonic light 10 is also emitted in one direction. This is convenient. Mirror 41 is an output mirror which is highly reflective of fundamental wave 9 and exhibits a high degree of permissivity to second harmonic light 10. Mirrors 42 and 43 are concave mirrors which are highly reflective of both fundamental wave 9 and second harmonic wave 10.

Figure 7:
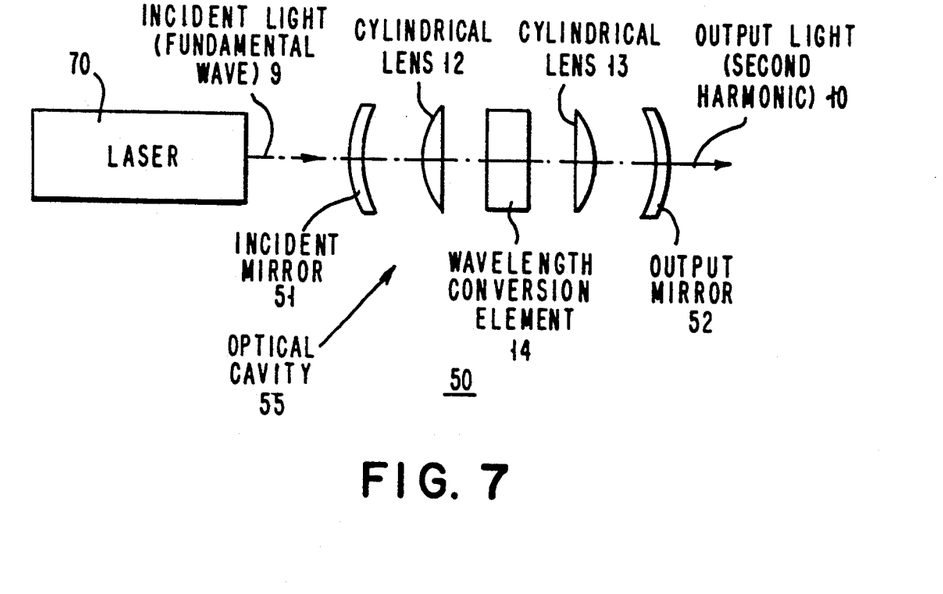
Figure 8:
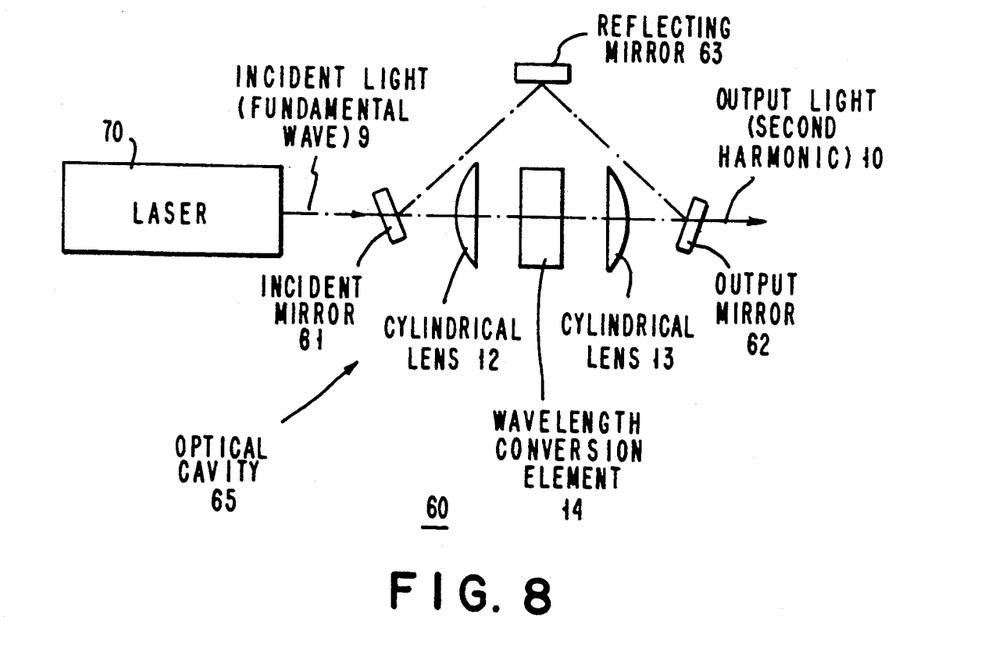

FIGS. 7 and 8 show yet other embodiments of the present invention. The constructions which are the same as the embodiment of FIG. 3 are assigned the same reference numerals and the description thereof is omitted. In the embodiments of FIGS. 7 and 8, an apparatus for wavelength conversion of laser light 50 (FIG. 7) or 60 (FIG. 8) includes crystal 14, cylindrical lenses 12 and 13 for focusing light on crystal 14, and reflecting mirrors 51, 52 (FIG. 7) or 61, 62, 63 (FIG. 8), thus forming optical cavity 55 (FIG. 7) or 65 (FIG. 8). An outside laser light source 70 is provided to both of optical cavities 55, 65, which convert the laser light (fundamental wave) 9 from laser light source 70 to its second harmonic light 10. Wavelength conversion apparatus 50 of FIG. 7 forms a Fabry-Perot type optical cavity. The wavelength conversion apparatus 60 of FIG. 8 forms a ring-type optical cavity. Reflecting mirrors 51 and 61 are entrance mirrors which introduce fundamental wave 9 into the cavity 55 or 65, and are highly reflective of both fundamental wave 9 and the second harmonic wave 10 in cavity 55 or 65. Output mirrors 52 and 62 are highly reflective of fundamental wave 9 and have a high degree of transparency to second harmonic wave 10. Reflecting mirror 63 is highly reflective of both fundamental wave 9 and second harmonic 10.

In the above description of the embodiments, the pair of cylindrical lenses 12 and 13 of the focusing optical system may be replaced by semitransparent cylindrical mirrors, which have the same effect as the cylindrical lenses described above.

As described above, the present invention produces excellent advantages in apparatus for non-linear optical wavelength conversion of the type which use an optical cavity, and a wavelength conversion element of a non-linear optical element placed in the optical cavity, particularly, an angle phase match type crystal. The effect of optical destruction liable to occur in the conversion element by the amplified light intensity in the cavity can be greatly reduced, while still obtaining a high wavelength conversion efficiency. The wavelength conversion apparatus of the present invention is most effective when the wavelength conversion of a continuous-wave weak light is accomplished by using an angle phase match type wavelength conversion element. An example of such is the generation of the second harmonic of an argon laser. This second harmonic exists in the deep ultraviolet region, which has applications in photolithography and other optical treatments. It can also apply to the wavelength conversion of laser light into the visible light region.

While the present invention has been described with respect to specific embodiments, it is not thus limited. Numerous modifications, changes, and improvements will fall within the spirit and scope of the invention.

What is claimed is:

1. An apparatus for converting the wavelength of a laser light beam, comprising:
   a plurality of reflecting surfaces;
   a wavelength conversion element interposed between said reflecting surfaces, some of the laser light beam entering the wavelength conversion element within an acceptance angle, the acceptance angle having a first larger magnitude in a first plane passing through the wavelength conversion element and a second smaller magnitude in a second plane passing through the wavelength conversion element, the first and second planes being perpendicular to one another;
   means for focusing said laser light beam on said wavelength conversion element; and
   said focusing means including means for making the cross section of said laser light beam focused on said wavelength conversion element non-circular so that the laser light beam entering the wavelength conversion element converges within the first larger magnitude of the acceptance angle more than within the second smaller magnitude of the acceptance angle to thereby improve the conversion efficiency while providing directional focusing and prevention of optical damage.

2. The apparatus of claim 1, wherein said means for making the cross section of said laser light beam non-circular includes means for making the cross section of said laser light beam elliptical.

3. The apparatus of claim 2, wherein said means for making the cross section of said laser light beam non-circular includes a pair of cylindrical mirrors sandwiching said wavelength conversion element therebetween.

4. The apparatus of claim 1, wherein said wavelength conversion element is an angle phase match type non-linear optical element.

5. The apparatus of claim 4, wherein said angle phase match type non-linear optical element is a beta-barium borate crystal.

6. The apparatus of claim 1, wherein said means for making the cross section of said laser light beam non-circular includes a pair of cylindrical lenses sandwiching said wavelength conversion element therebetween.

7. The apparatus of claim 1, wherein one of said plurality of reflecting surfaces is semitransparent so that input light passes through said one reflecting surface into said apparatus and another of said plurality of reflecting surfaces is semitransparent so that output light passes through said another reflecting surface from said apparatus.

8. The apparatus of claim 1, further comprising a continuous-wave laser device for generating input laser light to be converted.

9. The apparatus of claim 8, wherein said continuous-wave laser device is an argon laser.

10. The apparatus of claim 8, wherein said wavelength conversion element converts input laser light into a deep ultraviolet output light by doubling the frequency of said input laser light.

11. The apparatus of claim 1, wherein said wavelength conversion element converts input light into output light having a frequency of twice the frequency of said input light.

12. The apparatus of claim 1, wherein said wavelength conversion element converts input light having two frequencies into output light having a frequency of the sum of two input frequencies.

13. The apparatus of claim 1, wherein said plurality of reflecting surfaces form a Fabry-Perot type optical cavity generating a standing wave therein.

14. The apparatus of claim 1, wherein said plurality of reflecting surfaces form a ring-type optical cavity having a circulating path of light therein.

15. An apparatus for generating coherent light, comprising:
   a plurality of reflecting surfaces;
   a laser medium for generating laser light between said reflecting surfaces;
   a wavelength conversion element between said plurality of reflecting surfaces for converting the wavelength of said laser light, some of the laser light beam entering the wavelength conversion element within an acceptance angle, the acceptance angle having a first larger magnitude in a first plane passing through the wavelength conversion element and a second smaller magnitude in a second plane passing through the wavelength conversion element, the first and second planes being perpendicular to one another;
   means for focusing said laser light on said wavelength conversion element; and said focusing means including means for making the cross section of the laser light focused on said wavelength conversion element non-circular so that the laser light beam entering the wavelength conversion element converges within the first larger magnitude of the acceptance angle more than within the second smaller magnitude of the acceptance angle to thereby improve the conversion efficiency while providing directional focusing and prevention of optical damage.

16. The apparatus of claim 15, wherein said wavelength conversion element is an angle phase match type non-linear optical element.

17. The apparatus of claim 16, wherein said angle phase match type non-linear optical element is a beta-barium borate crystal.

18. The apparatus of claim 15, wherein said means for making the cross section of said laser light beam non-circular includes a pair of cylindrical lenses sandwiching said wavelength conversion element therebetween.

19. The apparatus of claim 15, wherein said means for making the cross section of said laser light beam non-circular includes a pair of cylindrical mirrors sandwiching said wavelength conversion element therebetween.

20. The apparatus of claim 15, wherein said laser medium is a continuous-wave type laser medium.

21. The apparatus of claim 20, wherein said laser medium is an argon laser generating visible light, said wavelength conversion element doubling the frequency of said visible light so as to output said coherent light in deep ultraviolet range.

22. The apparatus of claim 15, wherein said laser medium generates light having a plurality of frequencies and said wavelength conversion element converts said light to light having a frequency which is the sum of two frequencies of said light generated by said laser medium.

23. A method for converting the wavelength of a laser light beam, comprising:
   providing a plurality of reflecting surfaces;
   interposing a wavelength conversion element between said reflecting surfaces, some of the laser light beam entering the wavelength conversion element within an acceptance angle, the acceptance angle having a first larger magnitude in a first plane passing through the wavelength conversion element and a second smaller magnitude in a second plane passing through the wavelength conversion element, the first and second planes being perpendicular to one another;
   focusing said laser light beam on said wavelength conversion element such that the cross section of said laser light beam focused on said wavelength conversion element is non-circular so that the laser light beam entering the wavelength conversion element converges within the first larger magnitude of the acceptance angle more than within the second smaller magnitude of the acceptance angle to thereby improve the conversion efficiency while providing directional focusing and prevention of optical damage.

24. The method of claim 23, wherein said focusing step makes the cross section of said laser light beam elliptical.

25. The method of claim 24, wherein said focusing step is performed using a pair of cylindrical mirrors sandwiching said wavelength conversion element therebetween.

26. The method of claim 23, wherein said wavelength conversion element is an angle phase match type non-linear optical element.

27. The method of claim 26, wherein said angle phase match type non-linear optical element is a beta-barium borate crystal.

28. The method of claim 23, wherein said focusing step is performed using a pair of cylindrical lenses sandwiching said wavelength conversion element therebetween.

29. The method of claim 23, wherein one of said plurality of reflecting surfaces is semitransparent so that input light passes through said one reflecting surface and another of said plurality of reflecting surfaces is semitransparent so that output light passes through said another reflecting surface.

30. The method of claim 23, further comprising the step of providing a continuous-wave laser device for generating input laser light to be converted.

31. The method of claim 30, wherein said continuous-wave laser device is an argon laser.

32. The method of claim 30, wherein said wavelength conversion element converts input laser light into a deep ultraviolet output light by doubling the frequency of said input laser light.

33. The method of claim 23, wherein said wavelength conversion element converts input light into output light having a frequency of twice the frequency of said input light.

34. The method of claim 23, wherein said wavelength conversion element converts input light having two frequencies into output light having a frequency of the sum of two input frequencies.

35. A method for generating coherent light, comprising the steps of:
   providing a plurality of reflecting surfaces;
   positioning a laser medium for generating laser light between said reflecting surfaces;
   placing a wavelength conversion element between said plurality of reflecting surfaces for converting the wavelength of said laser light, some of the laser light beam entering the wavelength conversion element within an acceptance angle, the acceptance angle having a first larger magnitude in a first plane passing through the wavelength conversion element and a second smaller magnitude in a second plane passing through the wavelength conversion element, the first and second planes being perpendicular to one another; and
   focusing said laser light on said wavelength conversion element such that the cross section of the laser light focused on said wavelength conversion element is non-circular in shape so that the laser light beam entering the wavelength conversion element converges within the first larger magnitude of the acceptance angle more than within the second smaller magnitude of the acceptance angle to thereby improve the conversion efficiency while providing directional focusing and prevention of optical damage.

36. The method of claim 35, wherein said wavelength conversion element is an angle phase match type non-linear optical element.

37. The method of claim 36, wherein said angle phase match type non-linear optical element is a beta-barium borate crystal.

38. The method of claim 35, wherein said focusing step is performed using a pair of cylindrical lenses sandwiching said wavelength conversion element therebetween.

39. The method of claim 35, wherein said focusing step is performed using a pair of cylindrical mirrors sandwiching said wavelength conversion element therebetween.

40. The method of claim 35, wherein said laser medium is a continuous-wave type laser medium.

41. The method of claim 40, wherein said laser medium is an argon laser generating visible light, said wavelength conversion element doubling the frequency of said visible light so as to output said coherent light in deep ultraviolet range.

42. The method of claim 35, wherein said laser medium generates light having a plurality of frequencies and said wavelength conversion element converts said light to light having a frequency which is the sum of two frequencies of said light generated by said laser medium.

43. The method of claim 35, wherein said plurality of reflecting surfaces form a Fabry-Perot type optical cavity generating a standing wave therein.

44. The method of claim 35, wherein said plurality of reflecting surfaces form a ring-type optical cavity having a circulating path of light therein.

* * * * *